(12) United States Patent
Boutaghou

(10) Patent No.: US 6,568,252 B1
(45) Date of Patent: May 27, 2003

(54) FLYABILITY AND GLIDE METHODOLOGY FOR 100 GPSI

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/901,830

(22) Filed: Jul. 10, 2001

Related U.S. Application Data

(60) Provisional application No. 60/218,264, filed on Jul. 13, 2000.

(51) Int. Cl.⁷ .................................................. G01B 5/28
(52) U.S. Cl. ......................................................... 73/104
(58) Field of Search ................................... 73/105, 104

(56) References Cited

U.S. PATENT DOCUMENTS

| | | |
|---|---|---|
| 3,732,552 A | 5/1973 | Walraven |
| 4,340,956 A | 7/1982 | Miller |
| 4,605,977 A | 8/1986 | Matthews |
| 4,669,011 A | 5/1987 | Lemke |
| 4,853,810 A | 8/1989 | Pohl et al. |
| 4,931,887 A | 6/1990 | Hegde et al. |
| 5,021,906 A | 6/1991 | Chang et al. |
| 5,276,573 A | 1/1994 | Harada et al. |
| 5,305,294 A | 4/1994 | Kime et al. |
| 5,377,058 A | 12/1994 | Good et al. |
| 5,719,720 A | 2/1998 | Lee |
| 5,764,432 A | 6/1998 | Kasahara |
| 5,817,931 A | 10/1998 | Boutaghou |
| 5,862,015 A | 1/1999 | Evans et al. |
| 6,105,421 A * | 8/2000 | Yao et al. ...................... 73/105 |
| 6,267,004 B1 * | 7/2001 | Ku et al. ....................... 73/105 |
| 6,351,341 B1 | 2/2002 | Lee et al. ..................... 360/75 |

FOREIGN PATENT DOCUMENTS

| | | |
|---|---|---|
| WO | WO 97/32346 | 4/1997 |

* cited by examiner

Primary Examiner—Daniel S. Larkin
(74) Attorney, Agent, or Firm—Kinney & Lange, P.A.

(57) ABSTRACT

Disclosed is a method for testing the smoothness of a disc surface. A glide test is performed by first lowering the glide head until contact between the glide head and the disc surface occurs. The point of contact establishes a base line indicating the location of the disc surface. Once a base line is established, the glide head can be controlled so that it flies at the desired glide height above the disc surface. By first establishing the base line, the glide head can be flown with greatly increased precision at the desired glide height based on known relationships between glide height and various parameters, including spindle speed, various electrical parameters, or crown shape.

22 Claims, 4 Drawing Sheets

FLYABILITY AND GLIDE METHODOLOGY FOR 100 GPSI

CROSS-REFERENCE TO RELATED APPLICATION(S)

This application claims priority from Provisional Application Ser. No. 60/218,264 filed on Jul. 13, 2000, for "Flyability And Glide Methodology For 100 GPSI" by Zine-Eddine Boutaghou, the contents of which are incorporated by reference.

BACKGROUND OF THE INVENTION

The present invention relates to a system and method for testing a disc, and more particularly to a system and method of precisely positioning a glide head above a disc during a glide height test.

As the density of data recorded on magnetic discs continues to increase, the flying height of magnetic transducers with respect to the disc must be reduced to accurately read and write information on the disc. As a result, the magnetic recording disc must accommodate the lower fly height of the transducer and the slider supporting it, meaning that the disc surface must be extremely smooth and uniform. In order to certify that a magnetic disc is adequately smooth for use in a disc drive system, glide height tests are performed on the disc.

In addition to the general requirement of reduced fly height, magnetoresistive (MR) heads are extremely sensitive to small physical defects in the surface of the disc, such as undulations on the disc surface and microscopic debris on the disc. When the MR head strikes a defect, there is a momentary frictional heating of the MR element, known as a thermal asperity. This heating effect increases the resistance of the MR head, which causes data errors and loss of information in reading the disc. Thus, it is important to ensure the surface of any disc is relatively free of defects which may adversely affect the ability of the MR head to function.

Thus, one of the final steps in manufacturing a disc is to perform a glide height test. In conducting a glide height test, a single disc is placed on a spin stand and the disc is spun at extremely high speeds, often approaching over 10,000 revolutions per minute (rpm). A glide head suspended on a suspension arm is moved across the surface of a disc as the disc is spun. A typical glide head often comprises a piezoelectric transducer mounted on an air bearing slider. During the glide height test, the glide head "flies" over a disc surface at a predetermined height above the disc surface, known as the "glide height." If contact occurs between the glide head and the disc, an asperity at least as large as the glide height has been detected. Thus, it is possible to test the surface of a disc for asperities by controlling the glide height based on the size of the defect the glide head is meant to detect.

If the glide head encounters an asperity during the test, the collision causes the glide head to vibrate and deform, which in turn causes the piezoelectric element to vibrate and deform. Such contact may cause many vibration modes of the piezoelectric element and slider, with each mode generating a voltage at its specific frequency. The signals generated by the piezoelectric element are fed to a pre-amplifier and a band pass filter. A digital data acquisition system on the glide tester then processes the filtered data, uses the data to determine whether the disc passes or fails the glide height test. Should the disc fail a glide height test, it is possible to use a burnishing head to attempt to smooth out surface asperities.

In establishing the height at which the glide head is flying above the disc, a well documented relationship between the speed of rotation of the disc and the fly height of the glide head due to the air bearing is used. The spacing between the glide head and the disc are likewise controlled using a speed sensitive glide head. This practice has been adequate for many generations of discs, but is becoming inadequate as fly heights are reduced to as small as 0.5 microns. In particular, problems with calibration and sensitivity make it difficult to ensure that the glide head is flying at precisely the desired fly height.

Thus, there is a need in the art for determining the fly height of glide head with increased precision.

BRIEF SUMMARY OF THE INVENTION

To determine the fly height of glide head during glide height testing, the glide head is lowered until there is contact between the glide head and the disc surface. Once contact occurs, a control system uses the point of contact to establish a base line indicating the location of the disc surface. The glide height can be controlled relative to the base line so that the glide head is flown at precisely the desired glide height above the surface of the disc.

Once the base line is established, controlling the glide head so that it flies at the desired fly height above the base line can be achieved using many methods. For glide height testers using glide heads having piezoelectric transducers, the piezoelectric transducer can be actuated so that the glide head is moved to a desired clearance above the base line. Other embodiments for achieving the desired glide height involve utilizing well known relationships between the rotation speed of the disc and the air bearing surface to control the location of the glide head above the disc. It is also possible to use an electrical response of the glide head to bits recorded on the disc to control the glide head flight so that it flies at the desired glide height.

DETAILED DESCRIPTION

Figure 1:
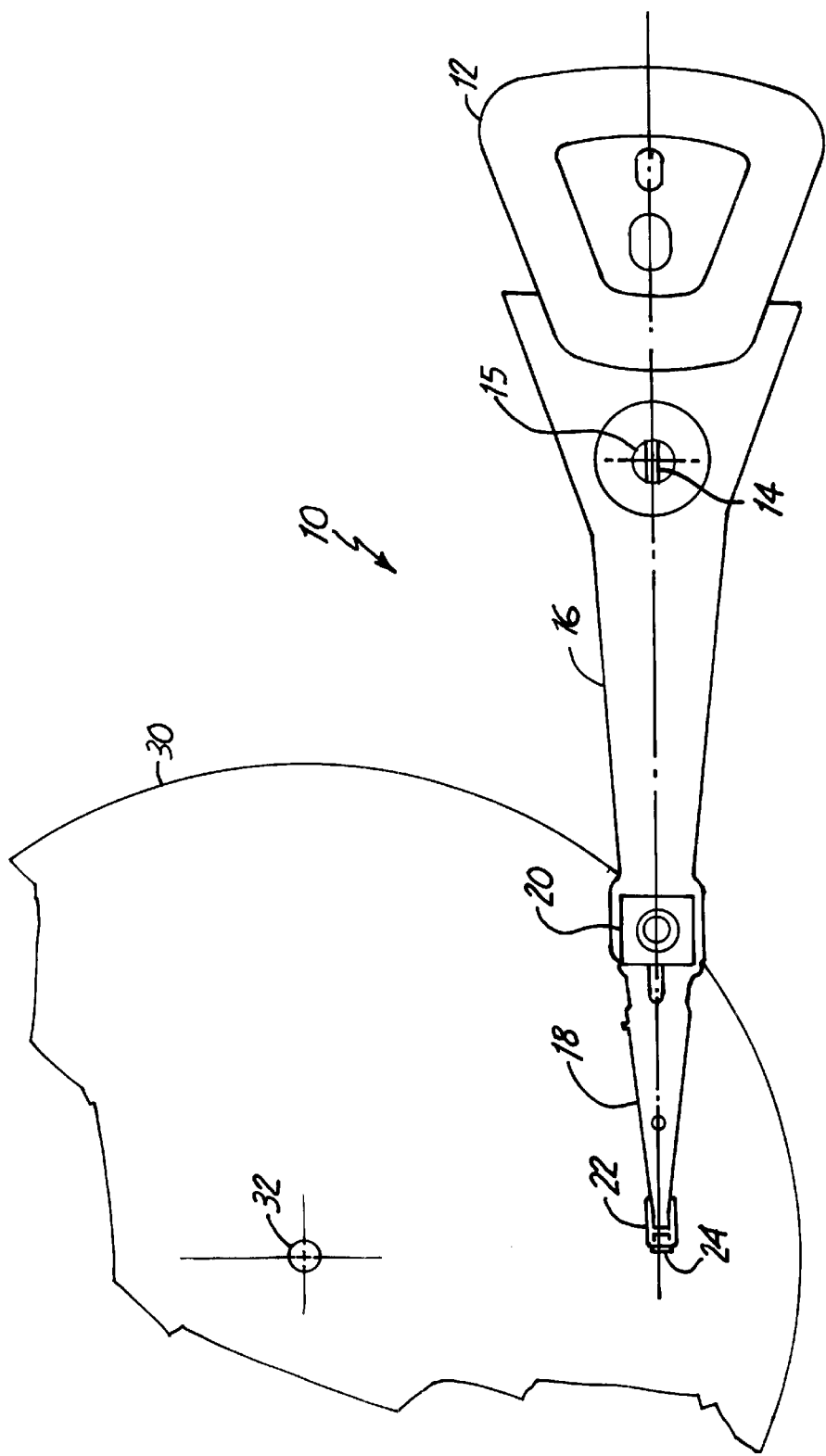
FIG. 1 is top view of a glide height test system for supporting a glide head over the surface of a disc.

FIG. 1 is a top view of a disc test system 10 supporting a glide head 24 over a surface of a disc 30. The test system 10 includes an actuator motor 12 arranged to rotate an actuator arm 16 around an axis 14 on a support spindle 15. The suspension arm 18 is connected to the actuator arm 16 at a mounting block 20. A gimbal 22 is connected to an end of the suspension arm 18, and carries a slider or glide head 24. The disc 30 is caused to rotate about an axis 32, such as by mounting the disc 30 on a spindle and rotating the spindle using a spindle motor. As the disc rotates around its axis 32, windage is encountered by the glide head 24 causing the glide head 24 to "fly" a small distance (the fly height) above the surface of the disc 30.

Figure 2:
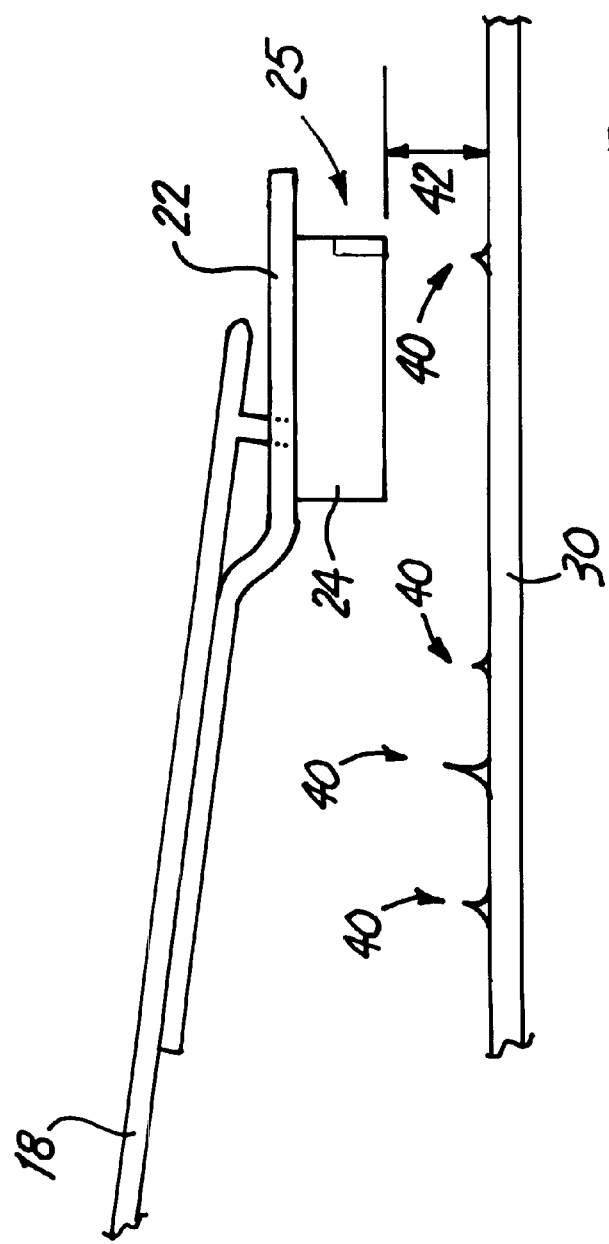
FIG. 2 is a greatly enlarged side view of a disc above which a glide head is suspended.

FIG. 2 is a greatly enlarged side view more clearly showing the glide head 24 suspended from the load beam 18 above the disc 30. The glide head 24 may further comprise a magnetoresistive transducer 25 located at its trailing edge. A gimbal 22 may be positioned between the load beam and the glide head 24 to impart increased flexibility to the glide head and allow it to follow the surface of the disc 30 more closely than if the glide head 24 were mounted directly on the suspension arm 18. Visible on the surface of the disc 30 are several defects 40. Also shown is the fly height 42, which indicates the distance between the glide head 24 and the disc surface.

When conducting a glide height test, the glide head 24 is positioned at a desired fly height 42 above the disc 30 and is moved over the surface 40 of the disc 30 as the disc 30 is spun. The glide head 24 is equipped with a sensor so that if the glide head 24 contacts a protrusion or other irregularity in the surface of the disc 30, the sensor on the glide head 24 indicates this fact. The fly height 42 is set based on the size of the defects 40 it is desired that the glide head 24 be able to detect.

In the past, the desired glide height 42 was achieved based on the fairly well known relationship between the rotational speed of the disc 30 and the effect the resulting windage had on the air bearing surface of the glide head 24. Thus, controlling the speed at which the disc 30 is rotating allowed for control of the glide height 42 of the glide head 24 above the surface of the disc 30. In the continuing quest for increased storage and speed, the current goal is a disc having an aerial density of 100 gigabytes per square inch. For such a disc, the height above the disc surface which an MR head would fly could be as small as 0.5 microns or less. Thus, glide tests must be performed at ever smaller fly heights to ensure that an MR head can safely fly at the required fly height above the disc without encountering an asperity or defect.

Glide tests now require fly heights below 1 micron to as small as about 5 to 8 nanometers. As glide heights decrease, current methods of controlling the fly height of glide heads are inadequate. In particular, problems with measurement, calibration, and sensitivity make it impossible to know with precision the exact fly height at which the glide head 24 is flying. Instead of relying on an estimated fly height based on the speed at which the disc 30 is rotating, the present invention achieves the desired fly height by first establishing a base line. The glide head 24 can then be positioned relative to the known base line to achieve a precise fly height.

Figure 3:
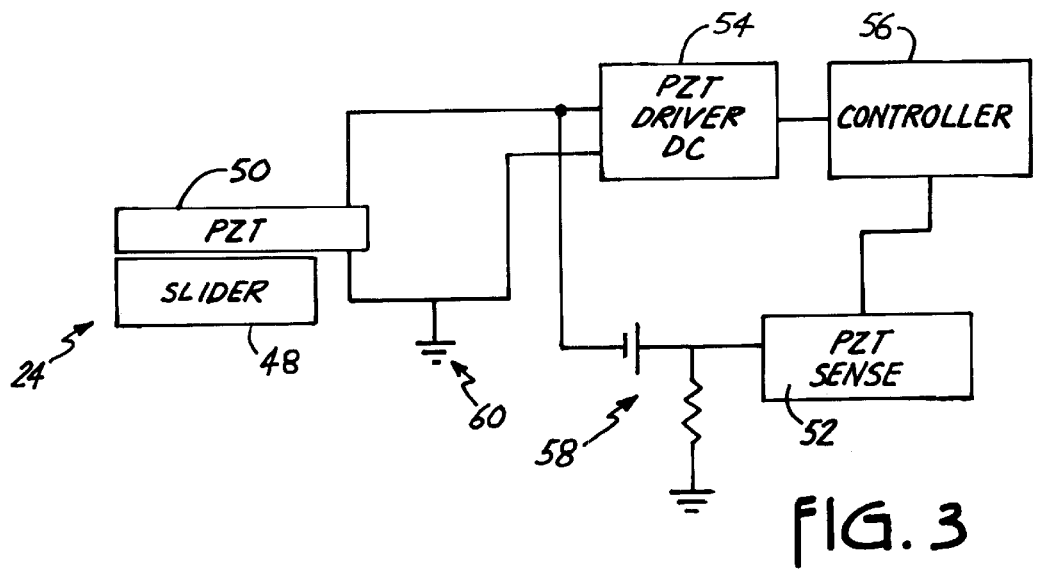
FIG. 3 is a block circuit diagram of a circuit suitable for implementing the present invention.

FIG. 3 illustrates control circuitry used to implement a glide head testing system according to one embodiment of the present invention. FIG. 3 illustrates a glide head 24 comprising a piezoelectric transducer 50. The piezo-electric transducer 50 functions as a sensor, allowing the glide head 24 to detect asperities on the disc when the glide head 24 encounters them. The piezoelectric transducer 50 can further function as an actuator to affect the fly height of the glide head 24.

Shown in FIG. 3 is the glide head 24 comprising a slider 48 configured with a piezoelectric transducer 50. To allow the piezoelectric transducer 50 to act as a sensor, sensing circuitry 52 is connected to the piezoelectric transducer 50. To allow for actuation of the piezoelectric transducer 50, the piezoelectric transducer 50 is also connected to drive circuitry 54. Both the sensing circuitry 52 and the drive circuitry 54 are connected to a controller 56. The circuit also includes a high pass filter 58 connected to the sensing circuitry 52. Finally, the glide head 24 is grounded at a ground connection 60.

In operation, the slider 48 allows the glide head 24 to fly above the surface of the disc on an air bearing created as the disc is rotated at high speed. As the slider 48 flies over the disc surface, it may contact a defect, causing the slider 24 to deform very slightly. Because the piezoelectric transducer 50 is affixed to the slider 48, such as by adhesive, the piezoelectric transducer 50 also deforms slightly, causing a charge in the piezoelectric transducer 50. This charge created when the piezoelectric transducer 50 is deformed creates a current which can be picked up by the sensing circuitry 52.

When a defect is encountered, the piezoelectric transducer 50 will generate a very high frequency signal having both a DC component and an AC component. The sensing circuitry 52 may comprise, for instance, an AC coupling which removes the DC component of the signal leaving only the component of the signal that varies with time. Based on the AC component of the signal, it is possible for the sensing circuitry 52 to determine the presence of a defect 40. The sensing circuitry 52 communicates the presence of the defect to the controller 56, which can then process the signal to record the location of the defect.

In addition to acting as a sensor, the piezoelectric transducer 50 may also be used as an actuator. The drive circuitry 54 can be used to apply a DC voltage to the piezoelectric transducer 50, causing it to deform. Once again, because the piezoelectric transducer 50 is affixed to the slider 48, as the piezoelectric transducer 50 deforms, the slider 48 likewise deforms. Deforming the slider 48 affects the geometry of the slider's air bearing surface, which in turn affects the fly height of the slider 48 above the surface of the disc.

The high pass filter 58 is necessary to allow the piezoelectric transducer 50 to be used both as a sensor and an actuator. The high pass filter 58 blocks the DC voltage used to actuate the piezoelectric transducer 50 from the sensing circuitry 52. The high pass filter 58 ensures that the piezoelectric sensing circuitry 52 collects only the AC signal indicating a defect has been encountered, but does not collect the DC signal used to actuate the piezoelectric transducer 50. The sensing circuitry 52 maximum input voltage is preferably much lower than the DC actuation voltage. Also, it is preferable that the actuation voltage rate of change be kept low enough that the high pass filter 58 can successfully prevent the actuation voltage from being sensed by the sense circuitry 52. The ground 60 on one side of the piezoelectric transducer 50 aids in acquiring a true differential measurement of the piezoelectric transducer 50.

The glide height test system illustrated by the circuit of FIG. 3 can be used to achieve a desired fly height with a high degree of precision. To achieve the desired fly height, the controller 56 directs the drive circuitry 54 to apply a voltage to the piezoelectric transducer 50. In response, the piezoelectric transducer 50 is caused to deform, which also deforms the slider 48 such that the fly height of the glide head 24 is affected. In this manner, the piezoelectric transducer 50 can be actuated to reduce the fly height of the glide head 24 until the glide head 24 comes into contact with the surface of the disc 30.

Once the glide head 24 contacts the disc, the piezoelectric transducer 50 causes a high frequency signal which is sensed by the sensing circuitry 52. The sensing circuitry 52 communicates the signal to the controller 56. The controller 56 uses this information to establish a base line which corresponds to the location of the disc surface. The fly height of the glide head 24 can then be controlled relative to the base line so that a precise fly height is achieved. Controlling the fly height relative to an established base line is much more precise than previous methods of controlling fly height based only on a relationship between the rotational speed of the disc and the air bearing on the slider.

The controller 56 distinguishes between the glide head 24 encountering an asperity and the glide head 24 encountering the surface of the disc based on the signal collected by the sensing circuitry 52. When the glide head 24 encounters an asperity, the resulting signal sensed by the sensing circuitry 52 occurs once per revolution of the disc. In contrast, when the glide head 24 encounters the surface of the disc, the signal occurs repeatedly for several revolutions, rather than once a revolution.

Once the surface of the disc has been sensed so that a base line can be established, there are numerous methods of controlling the fly height of the glide head relative to the base line so that the desired fly height is achieved. In one embodiment, the piezoelectric transducer 50 is once again used as an actuator to affect the fly height of the glide head 24. By applying a voltage to the piezoelectric transducer 50, it is possible to affect the fly height of the glide head so that the precise desired fly height can be achieved relative to the established baseline.

Figure 4:
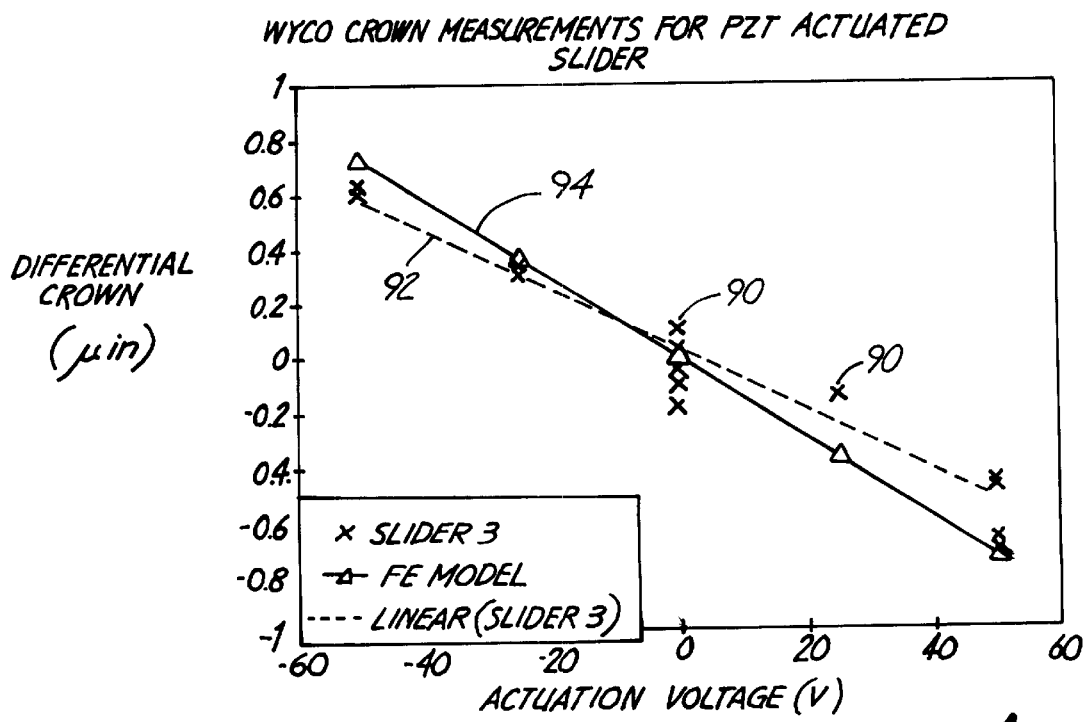
FIG. 4 is graph showing the crown measurements for a PZT actuated slider.

FIG. 4 is a graph illustrating an example of the relationship between an actuation voltage at the piezoelectric transducer 50 and the fly height of the glide head 24. Shown along the x-axis of FIG. 4 is actuation voltage, and shown along the y-axis is the differential crown in micro-inches. Crown refers to the geometry of the air bearing surface of the glide head, and differential crown is an indication of the displacement experienced by the crown when the piezoelectric transducer is actuated. As described above, applying a voltage to the piezoelectric transducer 50 causes the glide head 24 to deform. This deformation can be measured in terms of the differential between the dimensions of the crown in an unactuated glide head 24 and the dimensions of the crown in an actuated glide head 24.

FIG. 4 plots the results of measurements performed on numerous sliders. Each X 90 plotted on FIG. 4 corresponds to the data measured for five sliders. A first curve 92 is used to illustrate the generally linear behavior observed between an applied voltage and the differential crown for measurements taken of several sliders. In addition, a finite element analysis was performed based on the measured data to create a second curve 94. As can be seen by curve 94, the crown differential varies linearly as a function of the actuation voltage.

Because the shape of the crown has a direct and proportional affect on the fly height of the glide head, it follows that the fly height varies linearly as a function of the actuation voltage as well. Thus, once the relationship between the differential crown and fly height is established, such as is shown in FIG. 4, the controller 56 can use this relationship to precisely control the height at which the glide head 24 is flown above the disc surface.

In a further embodiment, it is possible to utilize the presently invented method with current technology. Current glide heads typically rely on the relationship between the rotation speed of the disc and the fly height of the glide head to control the glide head during the glide test. The concepts of the present invention can be easily extended to such a system.

Extending the present invention to current glide test systems once again involves establishing a base line corresponding to the location of the disc surface so that the fly height of the glide head can be controlled relative to the established location of the disc surface. To establish the base line, the glide head is once again brought into contact with the disc surface. To do so, the speed at which the disc rotates is slowed, such as by controlling the spindle motor speed, until the glide head contacts the surface of the disc.

The glide head is equipped with a sensor, typically a piezoelectric transducer 50 as discussed above. In such an embodiment, the piezoelectric transducer is used only as a sensor, and is not used in a secondary role as an actuator. In addition to allowing the glide head to sense asperities on the disc, the sensor is also capable of sensing the occurrence of contact between the glide head and the disc surface. Once contact with the disc surface has been sensed, the spindle speed is no longer slowed. The sensor provides a signal to a controller indicating the occurrence of glide head disc contact. The controller uses this information to establish a base line corresponding to the location of the disc surface. The fly height of the glide head can then be controlled relative to the base line so that a precise fly height can be achieved. The desired fly height of the glide head can be reached by controlling the speed at which the disc rotates based on the known relationship between the rotational speed of the disc and the fly height of the glide head.

Figure 5:
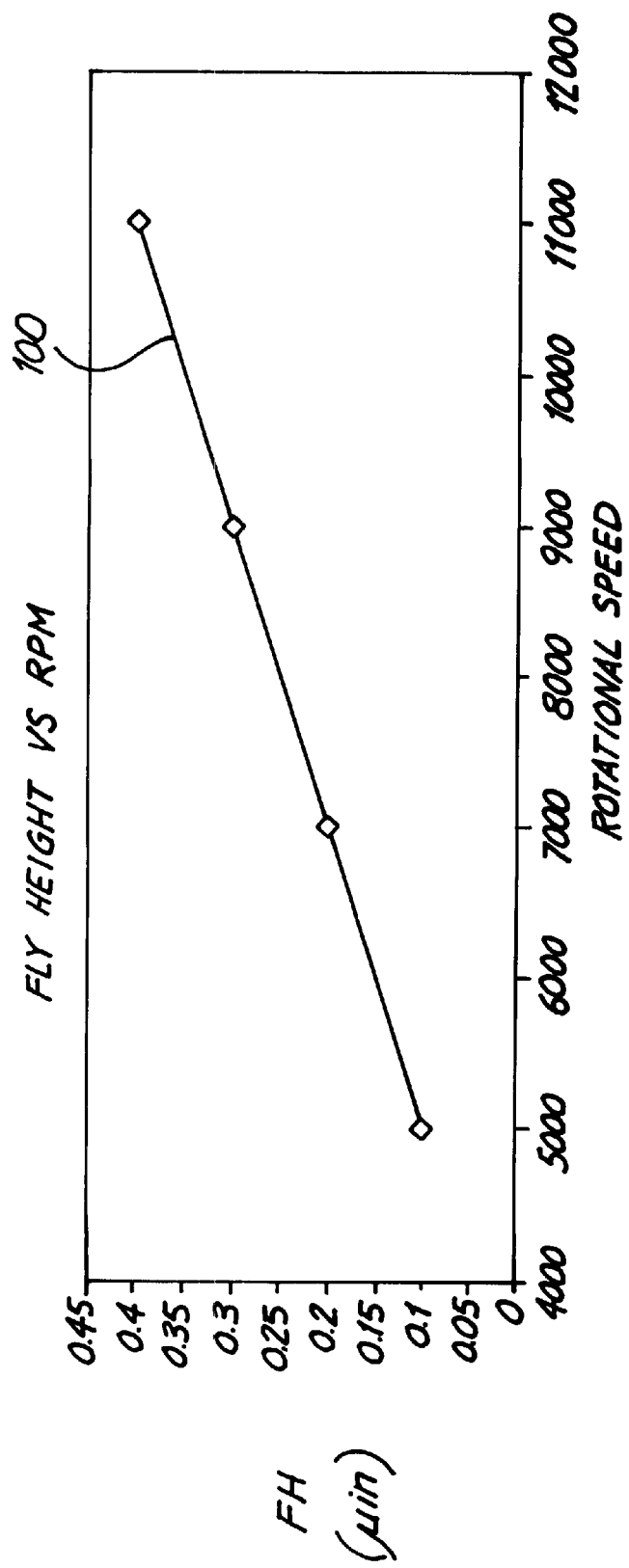
FIG. 5 is a graph illustrating the fly height of a glide head versus revolutions per minute of a disc.

FIG. 5 is a graph illustrating the fly height of a glide head versus revolutions per minute of the disc. Shown along the x-axis is the rotational speed in revolutions per minute, while shown along the y-axis is the fly height in micro inches. As can be seen from a curve 100 in FIG. 5, there is a linear relationship between the rotational speed of the disc and fly height of the glide height. Once the controller 56 has established a base line, the controller can increase the spindle speed based on this linear relationship and thus control the speed at which the disc rotates so that the glide head reaches the desired fly height.

An additional benefit of this embodiment is that it allows for air bearing design with reduced fly height versus speed sensitivity to manufacturing processes. The design of glide heads can be optimized for fly height speed sensitivity, instead of fly height itself. Thus, the air bearing can be optimized to a single sensitivity parameter such as crown, or speed sensitivity.

In addition to using the well known relationship between spindle speed and fly height, it is also possible to control the fly height of the glide head based on the pre-load force applied to the glide head by the suspension.

In yet another embodiment, the concepts of the present invention can be easily extended glide tests in which the control of the fly height of the glide head is based on an electrical response of a magnetoresistive (MR) transducer 25 carried on the glide head to data recorded on the disc. In such a system, the glide head comprises an MR transducer 25 capable of reading magnetic information encoded on the disc. In addition, the disc comprises magnetic information recorded on its surface.

Once again, a base line corresponding to the location of the disc surface is established so that the fly height of the glide head can be controlled relative to this established location of the disc surface. To establish the base line, the glide head is lowered until glide head disc contact occurs. The glide head can be lowered using any of the above disclosed methods, such as by controlling the rotational speed of the disc or by actuation of a piezoelectric transducer on the glide head. The head to disc contact is sensed using a sensor located on the glide head, preferably using a piezoelectric transducer 50, as described in connection with FIG. 3 above. Once contact occurs, and the controller uses this information to establish a base line corresponding to the location of the disc surface.

The controller controls the fly height of the glide relative to the location of the disc surface by utilizing the MR transducer located on the glide head. In such a system, the ability of the MR transducer to read magnetic information encoded on the disc is exploited by controlling the fly height of the glide head based on a magnetic read back amplitude or other electrical signal or electrical signal parameter sensed by the MR transducer. Based on the response of the MR transducer to the magnetic information on the disc, the controller can control either spindle speed, or actuate the piezoelectric transducer to affect the fly height of the glide head.

Specifically, it is possible to write bytes having a known width on the disc. The amplitude of the byte varies as a function of the clearance between the MR transducer and the disc. The closer the glide head is to the byte, the higher the amplitude of the byte sensed by the MR transducer. Thus, a parameter such as pulse width 50 (PW50) can be used to control the clearance above the established base line the controller flies the glide head. Rather than using a calibration curve, the controller controls the glide height based on when the desired electrical performance is reached.

Although the present invention has been described with reference to preferred embodiments, workers skilled in the art will recognize that changes may be made in form and detail without departing from the spirit and scope of the invention.

What is claimed is:

1. An apparatus for performing a glide test, the apparatus comprising:
    a glide head having a piezoelectric transducer for detecting surface asperities of a disc,
    drive circuitry for actuating the piezoelectric transducer to affect the fly height of the glide head;
    sensing circuitry for collecting a signal from the piezoelectric transducer when the glide head contacts the surface of the disc; and
    a control system which controls the drive circuitry to lower the glide head until the glide head contacts the disc surface, determines the location of the disc surface based on the signal collected from the piezoelectric transducer when the glide head contacts the surface of the disc, and which controls the fly height of the glide head based on the determined location of the disc surface.

2. The apparatus of claim 1 wherein the sensing circuitry comprises a high pass filter.

3. The apparatus of claim 1 wherein the glide head further comprises a magnetoresistive transducer.

4. The apparatus of claim 3 wherein the control system further controls the fly height of the glide head based on an electrical response of the magnetoresistive transducer to bytes recorded on the disc.

5. A method for performing a glide test, the method comprising:
    sensing a location of a disc surface by lowering a glide head until the glide head contacts the disc surface; and
    controlling a fly height of the glide head based on the sensed location of the disc surface.

6. The method of claim 5 wherein lowering the glide head comprises actuating a piezoelectric transducer located on the glide head.

7. The method of claim 6 wherein sensing a location of a disc surface comprises collecting a signal from the piezoelectric transducer when the glide head contacts the disc.

8. The method of claim 7 wherein controlling the fly height of the glide head comprises actuating the piezoelectric transducer based on a relationship between an amount of voltage applied to the piezoelectric transducer and a change in fly height of the glide head.

9. The method of claim 5 wherein lowering the glide head comprises slowing a speed at which the disc rotates.

10. The method of claim 5 controlling the fly height of the glide head comprises controlling the speed at which the disc rotates.

11. The method of claim 5 wherein controlling the fly height of the glide head comprises collecting an electrical response from a magnetoresistive transducer on the glide head to bytes recorded on the disc.

12. The method of claim 11 wherein collecting an electrical response comprises sensing an amplitude of the bit.

13. A method of determining a clearance between a glide head and a disc surface in preparation of performing a glide test, the method comprising:
    lowering a glide head until it contacts the disc surface;
    collecting a signal when the glide head contacts the disc surface; and
    determining a location of the disc surface based on the signal.

14. The method of claim 13 wherein lowering the glide head comprises actuating a piezoelectric transducer located on the glide head.

15. The method of claim 14 wherein sensing the contact between the glide head and disc surface comprises collecting a high frequency signal from the piezoelectric transducer located on the glide head.

16. The method of claim 15 wherein collecting the high frequency signal from the piezoelectric transducer located on the glide head further comprises filtering signals from the piezoelectric transducer to collect only desired high frequency signals.

17. The method of claim 13 wherein lowering the glide head comprises slowing a speed at which the disc is rotating.

18. An apparatus for performing a glide test, the apparatus comprising:
    a glide head having a piezoelectric transducer for detecting surface asperities of a disc;
    sensing circuitry for collecting a signal from the piezoelectric transducer when the glide head contacts the surface of the disc; and
    a control system which controls the drive circuitry to lower the glide head until the glide head contacts the disc surface, determines the location of the disc surface based on the signal collected from the piezoelectric transducer when the glide head contacts the surface of the disc, and which controls a fly height of the glide head based on the determined location of the disc surface.

19. The apparatus of claim 18 and further comprising drive circuitry for actuating the piezoelectric transducer to affect the fly height of the glide head.

20. The apparatus of claim 18 wherein the sensing circuitry comprises a high pass filter.

21. The apparatus of claim 18 wherein the glide head further comprises a magnetoresistive transducer.

22. The apparatus of claim 21 wherein the control system further controls the fly height of the glide head based on an electrical response of the magnetoresistive transducer to bytes recorded on the disc.

* * * * *